3,672,997
SEALED METALLIC OXIDE-INDIUM
SECONDARY BATTERY
Elihu C. Jerabek, Delmar, N.Y., assignor to
General Electric Company
Filed June 30, 1970, Ser. No. 51,172
Int. Cl. H01m 35/02
U.S. Cl. 136—20                                         4 Claims

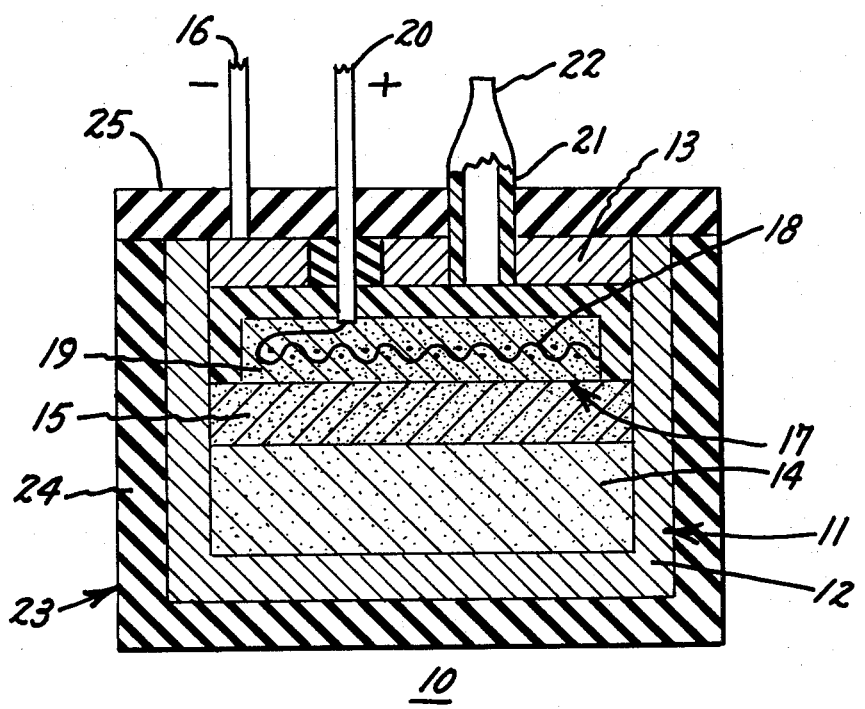

ABSTRACT OF THE DISCLOSURE

A sealed metallic oxide-indium secondary battery is disclosed which comprises a casing, a pressed indium powder anode positioned in the casing, a separator adjacent the anode, a metallic oxide cathode spaced from the anode and adjacent the separator, and an aqueous alkaline electrolyte contained within the casing.

---

This invention relates to sealed secondary batteries and, more particularly, to such batteries employing a pressed indium powder anode and a metallic oxide cathode.

A secondary battery has a metallic casing with an anode, normally a cellophane separator adjacent the anode, a cathode spaced from the anode and adjacent the anode, and an aqueous alkaline electrolyte in contact with the electrodes. Such batteries are manufactured generally in a charged state thereby available to produce electrical energy upon discharge.

One serious problem associated with such secondary batteries is that the anode is not thermodynamically stable in the aqueous alkaline electrolyte resulting in severe corrosion of this electrode and short-life for the battery. Another problem is to provide an anode which has a higher energy density when employed in such a cell.

One proposed solution to the above problems is set forth in an article entitled, "Indium as an Anode Material," by T. L. Boswell in the "Journal of the Electrochemical Society," vol. 105, No. 5, pages 239–241, 1958. Indium and some indium alloys in sheet form were evaluated for anodes in small sealed cells which employed mercuric oxide cathodes. However, as it is noted in the subject article, a further problem was presented in that the indium sheet material lacked hardness, strength, and tended to flow under low stresses. An increase in hardness could be obtained by using indium alloys. Indium-lead was a complete failure due to polarization at low current densities but indium-bismuth did not show such polarization.

My present invention is directed to overcoming the above problems by providing a high energy density battery which eliminates or reduces substantially the corrosion of the anode, and which overcomes the lack of hardness and strength.

The primary object of my invention is to provide a sealed secondary battery which has a high energy density and long life.

In accordance with one aspect of my invention, a charged secondary battery comprises a casing, a pressed indium or indium alloy powder anode positioned in the casing, a separator adjacent the anode, a metallic oxide cathode positioned in the casing adjacent the separator and spaced from the anode, and an alkaline electrolyte within the casing in contact with the anode and cathode.

These and various other objects, features and advantages of the invention will be better understood from the following description taken in connection with the accompanying drawing in which the single figure is a sectional view of a cell made in accordance with my invention.

In the single figure of the drawing, there is shown generally at 10 a charged secondary battery embodying my invention which has a metallic casing 11 including a metallic body portion 12 a a metallic cover portion 13 secured thereto. A pressed powder anode 14 of indium or an indium alloy is shown positioned within body portion 12. A chemically inert separator 15 of pressed magnesium oxide is positioned adjacent anode 14. An electrical lead 16 for anode 14 is connected to cover portion 13. A metallic oxide cathode 17 of silver oxide is shown positioned adjacent the opposite side of separator 15 and spaced from pressed powder anode 14. Cathode 17 has a silver screen current collector 18 embedded in the silver oxide cathode mixture 19. An electrical lead 20 extends from cathode 17 through cover portion 13. A tube 21 is provided in cover portion 13 to seal the battery as by crimping the tube at 22 after the battery has been vacuum filled with an alkaline electrolyte. An electrically insulating casing 23 including a body portion 24 and a cover portion 25 secured thereto surrounds tightly casing 11.

I found that I could form a sealed charged metallic oxide-indium secondary battery by providing a metallic casing, providing an uncharged pressed powder anode within the casing, which uncharged pressed powder anode consists of an indium oxide, such as indium sesqui oxide, or an indium alloy oxide pressed into the bottom of the metallic casing. As set forth in the above-mentioned publication, indium-lead alloys are not suitable as anodes but other indium alloys such as indium-bismuth are suitable. Magnesium oxide is then pressed on the upper surface of the anode to provide a separator. However, more conventional separators, such as cellophane or porous polyethylene can be used satisfactorily. A silver oxide cathode is positioned in the casing adjacent the other surface of the separator and spaced from the anode. The preferred cathode is prepared by employing a metallic oxide which is pressed into a brick with a metallic screen current collector embedded therein. While various materials are useful in cathodes in the present invention, I prefer to employ a pressed metallic oxide with a metallic screen embedded therein. Examples of suitable metallic oxides include silver oxide, mercuric oxide, manganese dioxide, etc. I prefer also to include with the silver oxide a silver powder addition.

The cathode is surrounded on its other surfaces by an electrically insulating material, such as polytetrafluoroethylene. The casing is closed and the casing enclosed in an electrically insulating casing, such as Lucite plastic. After the battery is vacuum filled with an alkaline electrolyte, the battery is sealed by closing off the filling tube. The battery is then charged in a conventional manner so that the battery is ready to produce electrical energy upon discharge. When the battery is charged, the oxide of indium or of an indium alloy is thereby converted to the respective indium metal powder or indium alloy powder. The resulting charged battery has a long-life and high energy density.

Examples of sealed uncharged and charged silver oxide-indium secondary batteries made in accordance with my invention are set forth below:

EXAMPLE 1

A battery was assembled generally in accordance with the above description and with the single figure of the drawing wherein a drawn stainless steel casing having a body portion and a cover portion were provided. The internal dimensions of the casing were 0.46 inch x 1.04 inches x 1.08 inches deep. A pressed powder uncharged anode was positioned in the bottom of the body portion by pressing approximately 3 grams of indium sesqui oxide at 10,000 p.s.i. into the bottom of the body portion. Approximately 1 gram of magnesium oxide was pressed on top of the anode at 50 to 500 p.s.i. to provide the separator.

Approximately 5 grams of Silver I oxide and 2 grams of silver powder were pressed onto a silver screen current collector at 10,000 p.s.i. The resulting cathode was a brick with dimensions of 0.9 inch x 0.42 inch x 0.24 inch with the screen embedded therein. The cathode was positioned against the opposite major surface of the separator and spaced from the anode. The other surfaces of the cathode were surrounded by an electrically insulating membrane of polytetrafluoroethylene. The cover portion was fitted to the body portion. The anode lead was connected to the cover portion while the cathode lead extended through the cover portion. An electrically insulating casing of Lucite plastic was fitted around the metal casing with the electrodes extending therethrough.

Approximately 5 milliliters of 10 N sodium hydroxide was vacuum-filled into the battery through the filling tube after which it was closed thereby sealing the battery. The resulting device was a sealed uncharged silver oxide-indium secondary battery.

EXAMPLE 2

The battery of Example 1 was then partially charged at about 11 ma./sq. in. to 77 ma./hrs. This charge was done at about 1.82 volts. The resulting device was a sealed charged silver oxide-indium secondary battery.

EXAMPLE 3

The battery of Examples 1 and 2 was discharged giving 47 ma.-hours at current densities of 11, 31 and 42 ma./sq. in. The capacity was 61 percent.

EXAMPLE 4

The above battery described in Examples 1–3 was charged again at varying current densities from 6 to 31 ma./sq. in. The charging was done at voltages above 1.86–1.9 which resulted in more inefficiency than during the initial charge. The capacity on charge was 615 ma.-hours. The above high voltages were necessary to maintain a reasonable, convenient rate of charging. On discharge, the capacity was 280 ma.-hours at 42 ma./sq. in.

EXAMPLE 5

The above battery described in Examples 1–4 was employed to obtain polarization data. A load was applied across the electrodes and the polarization behavior of the battery was measured, the results of which are set forth in the following Table I:

TABLE I

| Total cell voltage, volts | Current, amperes | Current density, ma./in.² |
|---|---|---|
| 1.67 | 0 | 0 |
| 1.586 | 2 | 4.2 |
| 1.572 | 4 | 8.3 |
| 1.562 | 6 | 12.5 |
| 1.549 | 8 | 16.6 |
| 1.537 | 10 | 21.0 |
| 1.506 | 15 | 31.0 |
| 1.475 | 20 | 42.0 |
| 1.422 | 30 | 63.0 |
| 1.373 | 40 | 84.0 |
| 1.327 | 50 | 104.0 |
| 1.126 | 100 | 208.0 |
| 0.924 | 300 | 625.0 |

While other modifications of the invention and variations thereof which may be employed within the scope of the invention have not been described, the invention is intended to include such as may be embraced within the following claims.

What I claim as new and desire to secure by Letters Patent of the United States is:

1. A sealed charged metallic oxide-indium secondary battery comprising a casing, a pressed powder anode positioned in the casing, the anode selected from the class consisting of indium powder and indium-bismuth alloy powder, a separator adjacent the anode, a metallic oxide cathode positioned in the casing adjacent the opposite side of the separator and spaced from the anode, and an alkaline electrolyte within the casing in contact with the anode and cathode.

2. In a sealed charged silver oxide-indium secondary battery as in claim 1, in which the separator is pressed magnesium oxide, and the electrolyte is sodium hydroxide.

3. A sealed uncharged metallic oxide-indium secondary battery comprising a casing, an uncharged pressed powder anode positioned in the casing, the anode selected from the class consisting of indium oxide powders and indium-bismuth alloy oxide powders, a separator adjacent the anode, a metallic oxide cathode positioned in the casing adjacent the opposite side of the separator and spaced from the anode, and an alkaline electrolyte within the casing in contact with the anode and cathode.

4. In a sealed uncharged silver oxide-indium secondary battery as in claim 3 in which the separator is pressed magnesium oxide, and the electrolyte is sodium hydroxide.

References Cited

UNITED STATES PATENTS

| | | | |
|---|---|---|---|
| 2,818,462 | 12/1957 | Solomon | 136—20 |
| 3,269,867 | 8/1966 | Fabel et al. | 136—86 D |
| 3,026,365 | 3/1962 | Hughes et al. | 136—120 R |
| 3,236,750 | 2/1966 | Hughes et al. | 136—120 R |
| 3,376,167 | 4/1968 | Hughes et al. | 136—83 R |
| 2,683,184 | 7/1954 | Boswell | 136—120 |
| 2,772,321 | 11/1956 | Ensign | 136—20 |
| 2,862,039 | 11/1958 | Ensign et al. | 136—120 |
| 2,959,631 | 11/1960 | Boswell | 136—120 |
| 2,422,045 | 6/1947 | Ruben | 136—107 |
| 2,669,597 | 2/1954 | Ruben | 136—107 |

WINSTON, A. DOUGLAS, Primary Examiner

C. F. LEFEVOUR, Assistant Examiner

U.S. Cl. X.R.

136—120

UNITED STATES PATENT OFFICE
CERTIFICATE OF CORRECTION

Patent No. 3,672,997      Dated June 27, 1972

Inventor(s) Elihu C. Jerabek

It is certified that error appears in the above-identified patent and that said Letters Patent are hereby corrected as shown below:

Column 4, heading of Table I, cancel "amperes" and substitute --milliamperes--.

Signed and sealed this 6th day of February 1973.

(SEAL)
Attest:

EDWARD M. FLETCHER, JR.
Attesting Officer

ROBERT GOTTSCHALK
Commissioner of Patents